(12) United States Patent
Afraite-Seugnet

(10) Patent No.: US 11,080,676 B2
(45) Date of Patent: Aug. 3, 2021

(54) METHODS AND SYSTEMS FOR ASSISTING A PURCHASE AT A PHYSICAL POINT OF SALE

(71) Applicant: Mehdi Afraite-Seugnet, Paris (FR)

(72) Inventor: Mehdi Afraite-Seugnet, Paris (FR)

( * ) Notice: Subject to any disclaimer, the term of this patent is extended or adjusted under 35 U.S.C. 154(b) by 0 days.

(21) Appl. No.: 16/965,990

(22) PCT Filed: Jan. 30, 2019

(86) PCT No.: PCT/FR2019/050213
§ 371 (c)(1),
(2) Date: Jul. 29, 2020

(87) PCT Pub. No.: WO2019/150047
PCT Pub. Date: Aug. 8, 2019

(65) Prior Publication Data
US 2021/0035084 A1    Feb. 4, 2021

(30) Foreign Application Priority Data
Jan. 31, 2018  (FR) ...................................... 1850812

(51) Int. Cl.
*G06Q 20/20* (2012.01)
*G07G 1/00* (2006.01)

(52) U.S. Cl.
CPC ......... *G06Q 20/208* (2013.01); *G06Q 20/204* (2013.01); *G07G 1/0072* (2013.01)

(58) Field of Classification Search
None
See application file for complete search history.

(56) References Cited

U.S. PATENT DOCUMENTS

| | | | |
|---|---|---|---|
| 5,488,202 A | 1/1996 | Baitz et al. | |
| 10,467,609 B2* | 11/2019 | Clark | G06Q 10/087 |
| 10,745,039 B1* | 8/2020 | Gao | B62B 3/1468 |
| 2002/0170961 A1 | 11/2002 | Dickson et al. | |
| 2012/0284132 A1 | 11/2012 | Kim et al. | |
| 2015/0206121 A1 | 7/2015 | Joseph et al. | |
| 2015/0371320 A1* | 12/2015 | Argue | B62B 3/142 705/26.8 |

(Continued)

OTHER PUBLICATIONS

Hamill, Jasper. "New check out tech . . . ". Retrieved from <https://www.news.com.au/technology/innovation/inventions/new-check-out-tech-banishes-supermarket-queues-by-scanning-all-the-items-in-a-basket-at-once/news-story/8e7775556e85939a478a830b5a92bcbe>. (Year: 2017).*

(Continued)

*Primary Examiner* — Nathan A Mitchell
(74) *Attorney, Agent, or Firm* — Brooks Kushman P.C.

(57) ABSTRACT

A system having a device for assisting a purchase, incorporating:
  a central portion;
  suspension arms which are connected to the central portion and extend on either side of the central portion, the suspension arms being intended to be connected to a portable container which is provided with an opening so as to allow the portable container to be carried by the device;
  at least one movement sensor which is configured to detect a movement through the opening of the portable container;
  at least one image sensor which is configured to detect at least one image of a scene at least partially covering the opening;
  a position sensor which is configured to determine the current position of the device in a point of sale.

16 Claims, 4 Drawing Sheets

(56) References Cited

U.S. PATENT DOCUMENTS

Figure 1:
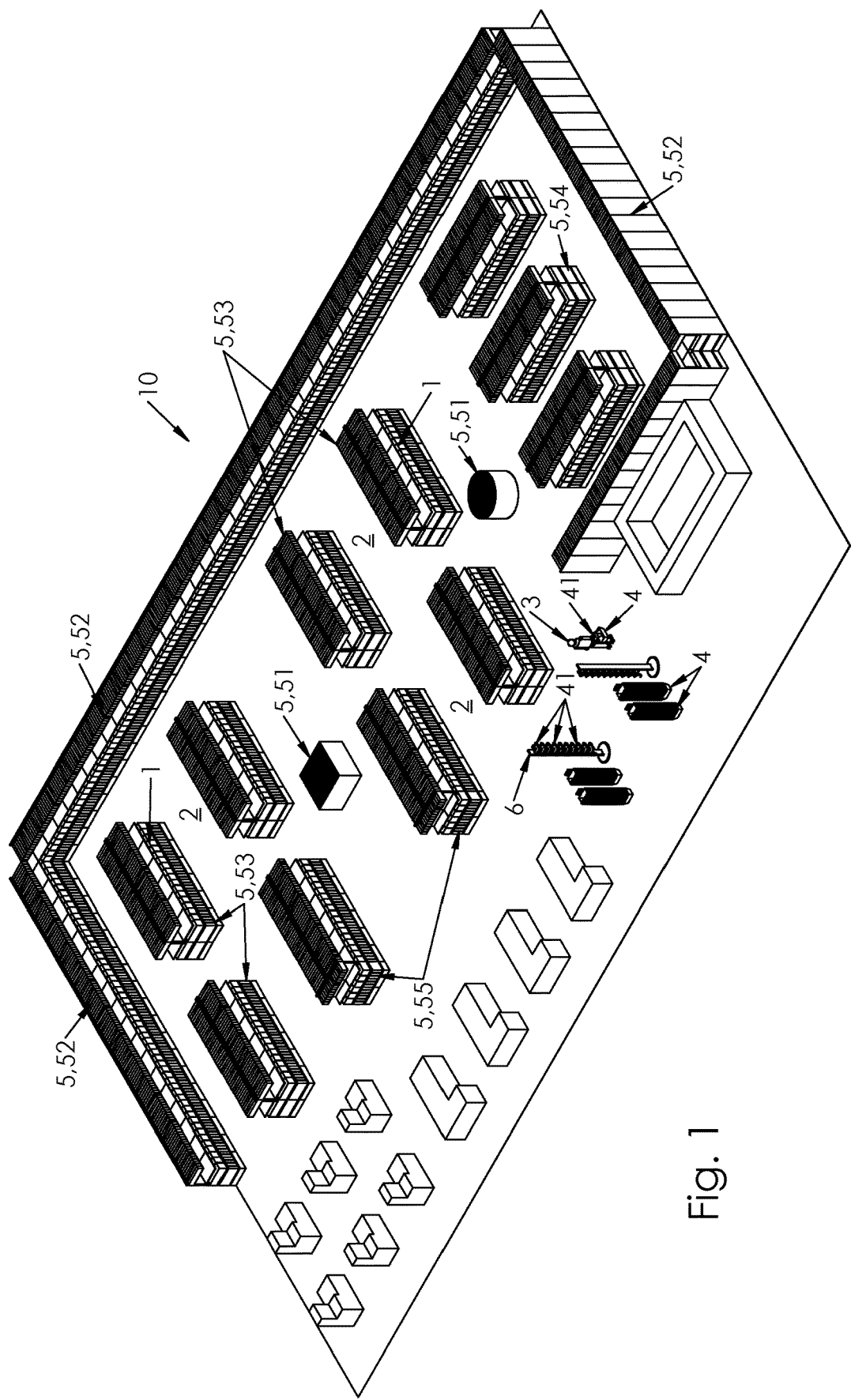

| | | | | |
|---|---|---|---|---|
| 2016/0376053 A1* | 12/2016 | Alves | ............... | A45C 3/04 206/459.5 |
| 2017/0323359 A1* | 11/2017 | Dey | ............... | G06Q 30/0609 |
| 2018/0060618 A1* | 3/2018 | Ferrer Alos | ............... | G06Q 20/208 |
| 2018/0082279 A1* | 3/2018 | Vasgaard | ............... | B62B 3/001 |
| 2018/0197218 A1* | 7/2018 | Mallesan | ............... | G06K 9/00771 |
| 2018/0260799 A1* | 9/2018 | Doerr | ............... | G06K 7/087 |
| 2018/0276637 A1* | 9/2018 | Nishio | ............... | G07G 1/0054 |
| 2018/0354540 A1* | 12/2018 | Bacallao | ............... | B62B 3/002 |
| 2019/0392505 A1* | 12/2019 | Amemura | ............... | G06K 9/03 |
| 2020/0092398 A1* | 3/2020 | Zhang | ............... | G06Q 10/087 |

OTHER PUBLICATIONS

Y. C. Wang and C. C. Yang, "3S-cart: A lightweight interactive sensor-based cart for smart shopping in supermarkets", IEEE Sensors J., vol. 16, No. 17, pp. 6774-6781, Sep. 2016. (Year: 2016).*

Anonymous: "Grocery Buggy", IBM Technical Disclosure Bulletin, International Business Machines Corp. (Thornwood), US, vol. 6, No. 31, Nov. 1, 1988 (Nov. 1, 1988), pp. 399-400, XP002013065, ISSN: 0018-8689.

International Search Report for PCT/FR2019/050213 prepared by the European Patent Office, dated Apr. 4, 2019.

* cited by examiner

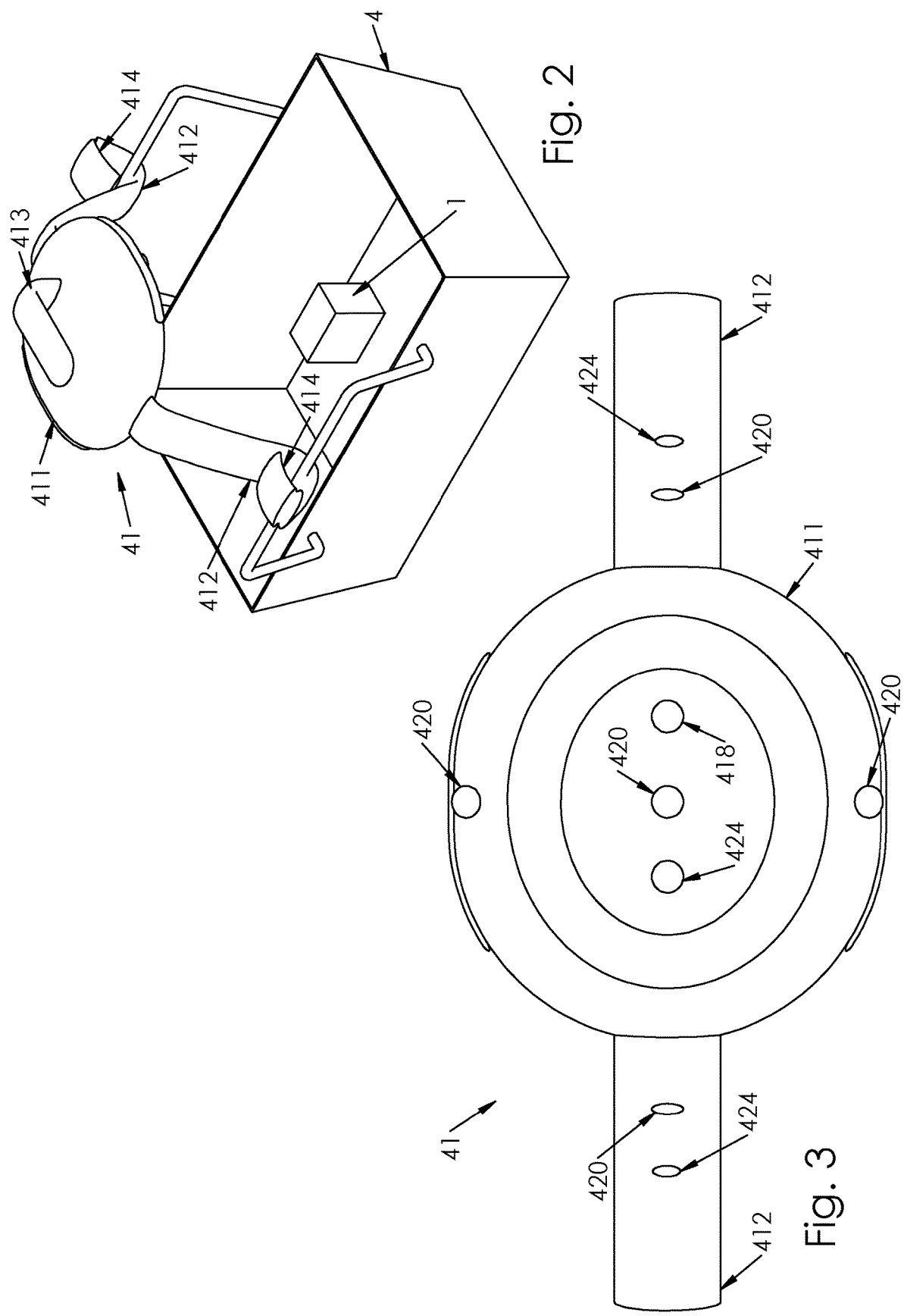

METHODS AND SYSTEMS FOR ASSISTING A PURCHASE AT A PHYSICAL POINT OF SALE

CROSS-REFERENCE TO RELATED APPLICATION

This application is the U.S. national phase of PCT Application No. PCT/FR2019/050213 filed on Jan. 30, 2019, which claims priority to FR Patent Application No. 1850812 filed on Jan. 31, 2018, the disclosures of which are incorporated in their entirety by reference herein.

The invention relates to the technical domain of methods and systems for improving the retail shopping experience, and more specifically to methods and systems for assisting purchasing at self-service retail points of sale.

In this case, "self-service retail point of sale" means any physical place of sale where customers can move freely through the sections and help themselves to the items offered for sale.

In such points of sale, a customer with a portable container, such as a basket or a tote bag, provided by the point of sale or belonging to the customer, selects items and places the items in the container, as said customer moves around the point of sale.

When finished shopping, the customer goes to the checkout, which is usually located at the exit of the point of sale, to pay for the items.

Once payment has been made, ownership of the items is transferred to the customer, thereby completing the purchase transaction.

The development of e-commerce is seen as a means of saving time. The result is that customers who still go to physical shops are less and less tolerant of spending lots of time there.

Consequently, the company Amazon recently proposed a grocery store with no checkout or payment terminals, but with cameras and sensors that detect the products taken from the sections or returned to the sections by the customer, keeping a tally in a virtual basket. Upon entering the store, the customer scans an application on their mobile terminal to identify the customer and to withdraw money from an Amazon account when the customer leaves. The technology used enables the habits and behaviors of shoppers to be observed, and eliminates waiting in line at the checkout. But this technology requires thousands of sensors and cameras located on the ceiling of the store, and implementation thereof, which is costly and complex, is only proposed for a single point of sale.

In existing conventional points of sale, in addition to having to wait in line for a checkout or payment terminal, the customer has to remove all of the items from their basket before returning said items (or placing said items in bags) once said items have been checked out at the checkout or terminal.

In other words, when making a purchase at a self-service point of sale, the customer places the items to be purchased in their basket while shopping and, when at the checkout, has to:

wait their turn, if it is busy,
unload all of the items carried in the basket,
wait for a cashier or a payment terminal to scan these items one by one and to validate payment, and
put the purchased items back into the same or another basket.

These steps involve an unwanted waste of time for the customer, which is often accompanied by a distorted perception of time. Indeed, even if objectively short, the time spent is often perceived by the customer as being considerably longer than the time that has actually elapsed, which has an impact on performance of the point of sale.

In order to improve the performance of a self-service point of sale, solutions intended to improve the shopping experience of customers have been proposed, notably by reducing the time spent at the checkout.

According to a first solution known as "self-scanning", the customer is invited to scan their own purchases using a barcode reader provided at the entrance of the point of sale. The customer uses this reader to scan the items placed in the basket as the customer moves along the sections of the point of sale. At the checkout, the cashier need only download the information from the reader and supervise payment. This makes checking out relatively easy for the customer.

Another solution known as "self-check-out" or "automatic check out" involves the customer doing the work of the cashier. Having arrived at a checkout device, the customer empties their basket and scans the items one by one themself, carefully following the instructions intended for customers. The customer then pays for the purchase and collects their items.

In another solution, radio-frequency identification (RFID) tags are built into the items offered for sale to enable the simultaneous identification of all of the items placed in the customer's basket. When the customer goes to the checkout to pay for the purchases, an RFID reader reads the RFID tags built into the different items without having to remove said items from the customer's basket, thereby speeding up the checkout process.

However, there are drawbacks to the known solutions, both for customers and for the points of sale.

The "self-scanning" and "self-check-out" methods, which are based on a guided contribution/collaboration by the customer, require technical and social acceptance of the tool provided.

A lack of familiarity with these tools or refusal to make an additional effort to adapt thereto hold back adoption by customers.

Furthermore, to ensure successful cooperation, the customer has to clearly understand what is expected of them, to be motivated to adopt the related behavior and to have the skills required to carry out the assigned tasks.

For some customers, the use of the tools provided requires an additional intellectual effort that said customers are not necessarily prepared to make.

For self-scanning, customers have to remember to scan each item placed in the basket.

However, it is common for customers to wonder whether an item just placed in the basket was scanned at all, or whether said item was scanned twice, resulting in a moment of doubt and a loss of time, both of which are undesirable.

Furthermore, these methods based on customer involvement effectively make the customer an "executive customer", which may be value destroyers for the customer.

Indeed, by scanning the items themself, either by means of self-scanning or self-check-out, a customer can feel that they are doing the tasks in place of the staff at the point of sale (thereby working for the point of sale without getting anything in return). This could be perceived badly by the customer and consequently the customer's shopping experience.

The shopping experience of the customer is also negatively affected by the essential mechanical aspect of scanning their items one by one.

The solution based on the use of radio frequency identification (RFID) tags is costly since it requires the configuration and integration of an RFID tag in all of the items offered for sale.

For some products, the cost of integrating an RFID tag can easily make the price thereof prohibitive in terms of the customer's expectations.

Furthermore, this option is only really available to points of sale that are involved in the production chain of the items offered for sale.

Such a solution is therefore not available to any point of sale offering for sale items of different categories and/or from different manufacturers.

This last solution also poses the problem of obtaining a precise count of the full content of a basket, i.e. the ability to precisely identify all of the items placed in said basket.

Notably, it is possible for an RFID tag of an item placed in the center of the basket to be covered by one or more other items (which act as radio wave insulators), thereby preventing communication with the RFID scanner/reader and resulting in the item in question not being precisely identified or not being detected at all.

Partial scanning of a basket results in a loss for the point of sale.

Document WO2016/135142 (Heinrich) describes a shopping cart including sensors that collect data that are used to automatically identify an item placed in the shopping cart by the customer.

However, this solution has drawbacks.

For the point of sale, shopping carts are, on account of the volume thereof, usually nestable and stored outside the point of sale (parking lot, near to the entrance of the point of sale or at the exit of the point of sale). The sensors installed therein can therefore easily be damaged when nesting the shopping carts. Furthermore, the sensors are not monitored by the point of sale and are accessible to users outside the point of sale, making said sensors vulnerable to attempted tampering or damage. Moreover, shopping carts are liable to be subjected to impacts that could negatively affect the correct operation of the sensors.

Furthermore, depending on the requirements of the customer (for example, fewer than ten items) and/or the range or space at the point of sale (small items, luxury items, insufficient space to move around with a shopping cart, presence of obstacles or stairs preventing use of shopping carts), a shopping cart may not be suited to shopping in such points of sale.

Furthermore, to benefit from the advantages of the system described in document WO2016/135142, the customer is required to use said shopping cart. This solution is not available to customers with a tote bag not designed for this solution.

Furthermore, the shopping cart is usually provided by the point of sale, such that the customer is required to retrieve their items and return the shopping cart used to the point of sale once shopping is completed. This solution, although able to speed up the check-out procedure for customers, does not save the time required to retrieve the items from the shopping cart.

One objective of the present invention is to overcome the aforementioned drawbacks.

Another objective of the present invention is to propose a purchase assistance solution requiring less customer effort.

Another objective of the present invention is to improve the shopping experience at a self-service retail point of sale by minimizing the elapsed time as perceived by the customer.

Another objective of the present invention is to improve the shopping experience at a self-service physical point of sale by reducing the time required to scan items at the checkout.

Another objective of the present invention is to promote shopping activities.

One objective of the present invention is to propose a system that provides an updated list of the items in the customer's basket, as the customer makes their purchases at a self-service point of sale.

Another objective of the present invention is to propose methods and a system that streamline and speed up the checkout procedure.

Another objective of the present invention is to propose a purchase assistance device in a self-service point of sale for a customer having their own basket/tote bag or a portable container provided by the point of sale.

Another objective of the present invention is to propose a purchase assistance system for a customer having any type of portable container, notably a portable container that belongs to the customer and that can be of practically any shape.

Another objective of the present invention is to encourage the use of connected digital technologies in warehouses (smart-shopping) to improve the shopping experience in physical points of sale.

For this purpose, a system comprising a customer purchase assistance device at a self-service retail point of sale is firstly proposed, including:
  a central portion,
  suspension arms which are connected to the central portion and extend on either side of the central portion, said suspension arms being intended to be connected to a portable container provided with an opening enabling an item offered for sale at the point of sale to be placed in this portable container, so as to allow said portable container to be carried by said device, the central portion facing said opening when said device is being used to carry the portable container,
  at least one movement sensor which is configured to detect a movement through the opening of the portable container when said device is being used to carry the portable container,
  at least one image sensor which is configured to detect at least one image of a scene at least partially covering the opening, when said device is being used to carry the portable container and the movement sensor has detected a movement through said opening,
  a position sensor which is configured to determine the current position of said device in the point of sale, the system also including:
  processing means provided with information on a list of items offered for sale at the point of sale and that are configured to recognize, with a predetermined confidence level, an item appearing in said at least one image, this item being recognized from a reduced list of items included in said list of items, this reduced list of items being determined as a function of a position of said device determined by the position sensor.

Various additional features may be implemented, individually or in combination:
  the reduced list of items is determined as a function of the current position and/or a previous position of the purchase assistance device,
  the central portion of the purchase assistance device includes an image sensor, the purchase assistance device also includes a weight sensor that is configured to measure a variation in the weight of the portable container when the device is being used to carry the portable container, the processing means also using this variation to recognize said item appearing in said at least one image, the purchase assistance device also includes at least one distance sensor that is configured to measure a distance between said distance sensor and an item at least partially within the measurement field of said distance sensor, contactlessly and when the device is being used to carry the portable container, the suspension arms include retaining means that are designed to hold this portable container open when said device is being used to carry the portable container, the retaining means include a contact sensor that is configured to detect the use of said device to carry a portable container, the purchase assistance device includes a handle that is linked to the central portion, the device includes a card reader that is configured to read a customer identifier from a physical or virtual card, the processing means being configured to associate said device with said customer identifier.

Secondly, an assembly including a portable container and the purchase assistance device is proposed. In certain embodiments, the portable container is made of deformable material.

Figure 6:
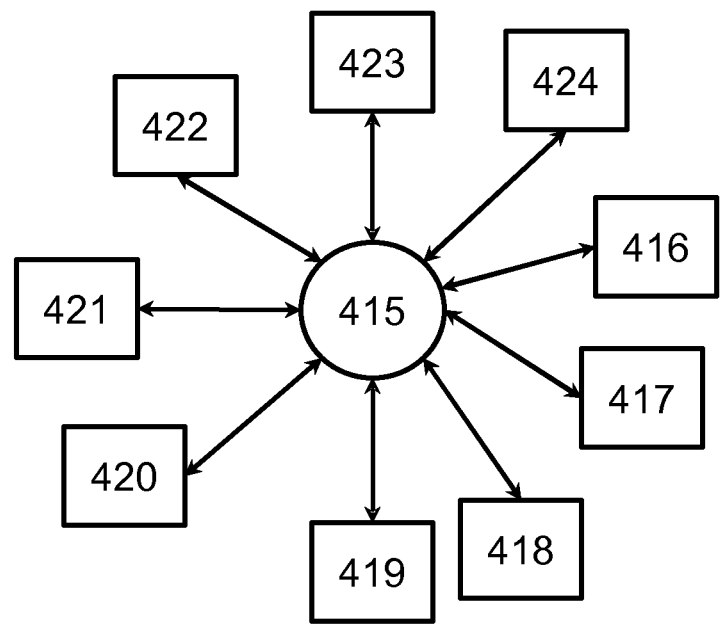
Figure 7:
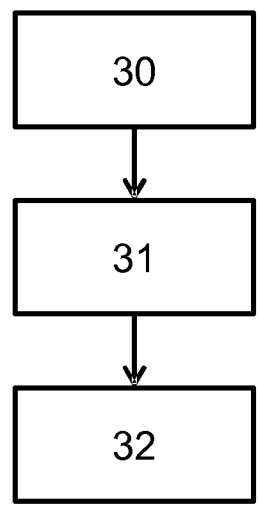

Other features and advantages of the invention are set out more clearly and specifically in the description of embodiments provided below with reference to the attached drawings, in which:

FIG. 1 is a schematic diagram of a point of sale enabling implementation of different embodiments, FIGS. 2 to 5 are non-limiting functional schematic representations of a purchase assistance device according to different embodiments, FIG. 6 is a schematic view of the components included in a purchase assistance device according to different embodiments, FIG. 7 is a schematic diagram of a purchase assistance method for a customer in a point of sale.

In this case, "self-service retail point of sale" means any physical point of sale, which may be specialized in a given category of products or otherwise, where customers can move about freely and help themselves to the items offered for sale.

The point of sale is for example a boutique, a bazar, a specialist store, a big-box store, a supermarket or a hypermarket.

By way of non-limiting example, self-service retail points of sale can include stores specializing in beauty products, parapharmacies, duty-free stores, grocery stores, bookstores, big-box food stores, small supermarkets, large DIY stores, supermarkets or hypermarkets belonging to a large-scale food retailer.

In such points of sale, as shown in FIG. 1, the items 1 are offered for sale in sections 2 through which a customer 3 with a portable container 4 can move freely and fill a basket during said movement without the intervention of the staff of the point of sale 10.

The sections 2 at the point of sale 10 are most commonly store gondolas or, more generally, supports 5 (displays, trays, stands, shelves, pallets and the like) designed to support or contain (in the case of refrigerated store gondolas) the items 1 offered for sale.

These store gondolas can be provided in a range of forms, such as island gondolas 51 and/or wall gondolas 52 and/or central gondolas 53 and/or rack gondolas 54.

Gondola heads 55 can also be arranged at the end of aisles of central gondolas 53.

The items 1 are usually placed on store gondola shelves or attached to pegs, bars or arms mounted on the store gondolas or on any other support 5.

With reference to FIGS. 2 to 5, the portable container 4 is being carried by the customer 3 using a purchase assistance device 41 that is designed to help the customer 3 to make purchases in the point of sale 10.

In certain embodiments, the purchase assistance device 41 is an integral part of the portable container 4.

In other embodiments, the purchase assistance device 41 is coupled removably to the portable container 4. In other words, the purchase assistance device 41 can be separated from the portable container 4 and can be mounted thereon or removed therefrom.

The purchase assistance device 41 and the portable container 4 are, in certain embodiments, provided to the customer 3 separately or assembled, for example at the entrance to the point of sale 10 or at any other location of the point of sale 10.

The portable container 4 is for example a basket with handles enabling the basket to be held and carried comfortably, with or without the purchase assistance device 41.

More generally, the portable container 4 is any recipient/container/basket/bag having fastening points (such as attachment points, holes, slots, anchoring elements, handles) that are designed to receive the purchase assistance device 41 and to be carried comfortably by the customer 3 using this purchase assistance device 41.

The portable container 4 can be made of one or more rigid, semi-rigid or deformable materials.

For example, the portable container 4 is a basket with handles made of a polymer material or metal wire, a tote bag made of fabric (for example nylon or cotton) or a kraft-paper bag.

The portable container 4 can be provided to the customer 3 by the point of sale 10, offered for sale at the point of sale 10, or brought by the customer 3.

In certain embodiments, so as not to occupy space at the point of sale 10, the portable container 4 can be folded and/or nested/stacked when separated from the purchase assistance device 41.

The portable container has an opening that provides access to the inside of this portable container 4. This opening enables the customer 3 to insert or remove items 1. The opening is usually a main opening opposite the bottom of the portable container 4.

When the customer 3 carries the portable container 4 using the purchase assistance device 41, this purchase assistance device 41 is above the portable container 4.

In other words, the purchase assistance device 41 overhangs the opening of the portable container 4.

The purchase assistance device 41 therefore faces the opening of the portable container 4.

The inside of the portable container 4 is easily accessible to the customer 3 from the space on either side of the purchase assistance device 41.

In certain embodiments, the purchase assistance device 41 is in the form of a handle or the like.

In certain embodiments, the purchase assistance device 41 is mounted pivotingly on the portable container 4 with or without a vertical locking system.

Alternatively, where the purchase assistance device 41 is an integral part of the portable container 4 (i.e. when said device and the portable container 4 together form a single part) or where said device is mounted thereon, the purchase assistance device 41 is held vertical opposite the opening of the portable container 4 such as to divide the space for accessing the inside of said portable container 4 into substantially identical subspaces.

Figure 4:
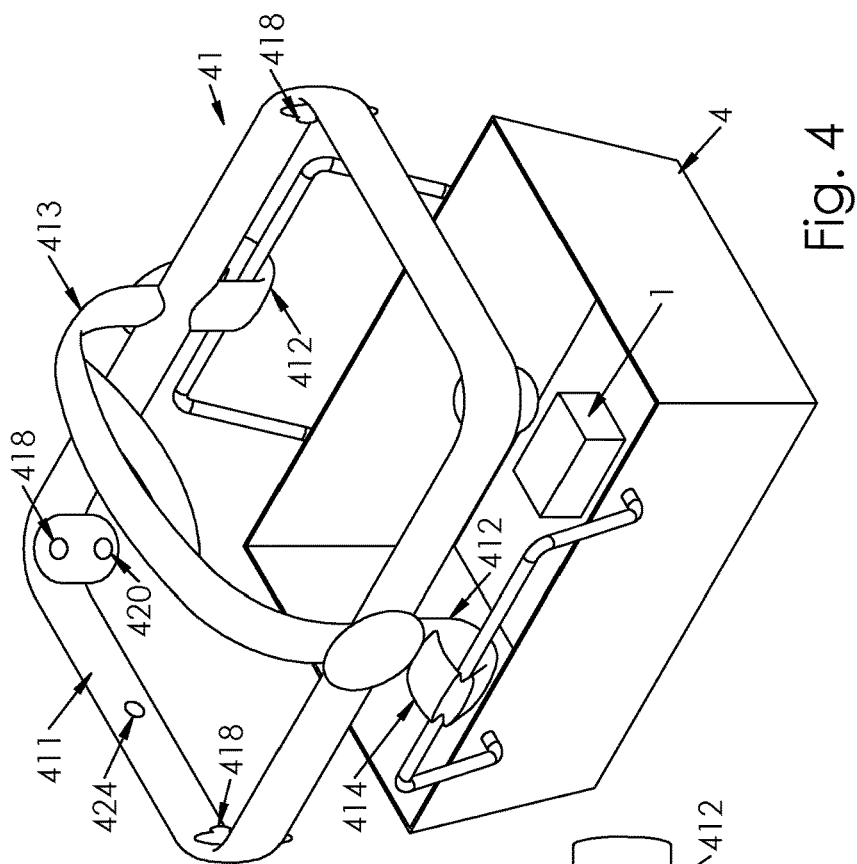
Figure 5:
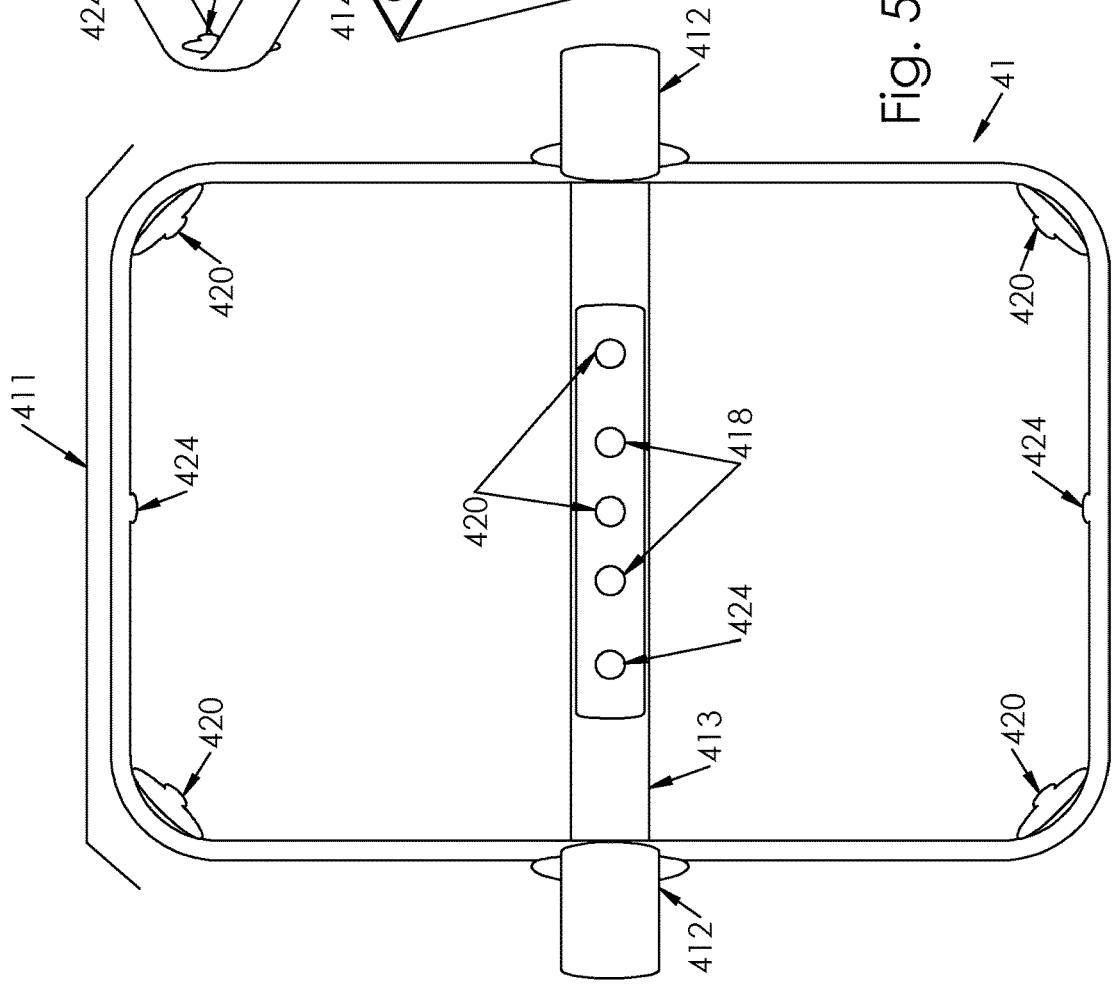

In the example in FIGS. 2 and 4, the purchase assistance device 41 separates the opening for accessing the inside of the portable container 4 into two substantially identical subspaces.

The purchase assistance device 41 has a central portion 411, suspension arms 412 that are linked to the central portion 411 and that extend from either side of said central portion 411, and a handle 413 linked to the central portion 411.

In the examples in FIGS. 2 to 5, the purchase assistance device 41 has two suspension arms 412 that extend from two opposing side faces of the central portion 411.

In another embodiment (not shown), the purchase assistance device 41 has three, four or more than four suspension arms 412.

In certain embodiments, the suspension arms 412 are substantially identical and distributed uniformly about the central portion 411.

The suspension arms 412 are designed to hold the portable container 4 open so that the inside or the content thereof can be seen, notably if said portable container is easily deformable (for example bags made of plastic, fabric or kraft paper).

In certain embodiments, the suspension arms 412 are telescopic and/or rigid enough to hold the portable container 4 open while the portable container is being carried by the purchase assistance device 41 so that the inside thereof can be seen.

The suspension arms 412 enable the purchase assistance device 41 to hold the handles of the portable container 4 apart. To do so, each suspension arm 412 has retaining means 414 at the distal portion thereof.

The retaining means 414 enable the handles of the portable container 4 to be held apart, thereby holding this portable container 4 open so the inside thereof can be seen.

In certain embodiments, the retaining means 414 include a reclosable ring. The reclosable ring has magnetic ends that enable said ring to be closed about the handles of the portable container 4 and to facilitate withdrawal of the purchase assistance device 41.

The handle 413 of the purchase assistance device 41 is designed to enable the portable container 4 to be comfortably carried in one hand. In certain embodiments (not shown in the figures), the handle 413 is mounted pivotingly on the central portion 411. For this purpose, a neck extending from the central portion 411 links the handle 413 to this central portion 411. In certain embodiments, the neck can extend telescopically or in the form of a notched stem.

The central portion 411 facing the inside of the portable container 4 carried by the purchase assistance device 41 includes a processing unit 415 linked to a plurality of sensors and to at least one wireless communication interface built into the purchase assistance device 41.

These means are used to identify the items 1 in the portable container 4 carried by the customer 3.

In this case, processing unit 415 means any physical device (including a processor, memory, buses and other electronic components used to execute computer programs) that is able to capture data and to provide the functionality required to implement a data processing method.

In certain embodiments, the purchase assistance device 41 includes a first wireless communication interface 416 enabling direct or indirect communication between the processing unit 415 and a local or remote server, such as a processing server, and/or a payment server, and/or a customer account server, and/or a push notification server, and/or a messaging server. This first wireless communication interface 416 is for example a Wi-Fi® interface, a WiMax® interface, or an evolved universal terrestrial radio access network interface (such as 3G, 4G or 5G).

In certain embodiments, this first wireless communication interface 416 enables communication over a local network between the processing unit 415 and a plurality of access points distributed throughout the point of sale 10. The access points are arranged throughout the point of sale 10 in a predetermined mesh (such as by stage, radius or zone). Each of these access points is linked to one or more remote servers and routes communication from the processing unit 415 to the appropriate remote/local servers as a function of the content of the communication, the position of the purchase assistance device 41 in the point of sale 10, or the availability of the destination server.

In a variant or in combination, the purchase assistance device 41 has a second wireless communication interface 417 enabling communication between the processing unit 415 and a user terminal (such as a smartphone, a tablet or a phablet), connected objects or beacons arranged according to a predetermined mesh in the point of sale 10. This second wireless communication interface 417 is for example a Bluetooth® interface, a HomeRF® interface, a ZigBee interface, or an infrared interface (IR).

The purchase assistance device 41 includes a movement sensor 418. This movement sensor 418 is configured to detect any movement involved in inserting or removing an item 1 into/from the portable container 4 (such as any entry into the inside of the portable container 4).

In certain embodiments, a plurality of movement sensors 418 is arranged inside the purchase assistance device 41 to cover the entire opening of the portable container 4.

By way of example, a plurality of infrared movement sensors 418 is arranged on the lower face (in the case shown in FIG. 2) and/or the inner face (in the case shown in FIG. 4) of the central portion 411 of the purchase assistance device 41. These movement sensors 418 are oriented such that the fields of vision thereof together at least partially cover the opening and/or the inside of the portable container 4.

The movement sensor 418 notifies the processing unit 415 of any movement through the opening of the portable container 4 that is detected.

The purchase assistance device 41 advantageously includes a weight sensor 419 that is used by the processing unit 415 to detect any change/variation in the weight of the portable container 4 carried by the customer 3. This enables the processing unit 415 to determine this variation. A variation in weight can be caused by an item 1 being placed in or removed from the portable container 4. The processing unit 415 then has a value of the weight of an item 1 that has just been placed in or removed from the portable container 4. The sensitivity of the weight sensor 419 can be set as a function of the lowest weight of the items 1 offered for sale and/or as a function of the differences between the weights of different items 1 offered for sale. In certain embodiments, the weight sensor 419 continuously samples the current weight of the portable container 4, at a predetermined frequency or when requested by the processing unit 415.

The variations in the weight of the portable container 4 that are detected by the weight sensor 419 are known at all times by the processing unit 415, which in certain embodiments saves said variations in a buffer memory of predetermined size.

In certain embodiments, the weight sensor 419 is built into the handle 413 or into the suspension arms 412 of the purchase assistance device 41.

The processing unit 415 can request a continuous or discrete weight reading from the weight sensor 419 for a predetermined time correlated to the detection of movement by the movement sensor 418.

In a variant, the weight sensor 419 communicates the measurements taken at a predetermined frequency. These measurements are saved in a buffer memory and time-stamped by the processing unit 415. Consequently, when the movement sensor 418 notifies a detected movement, the processing unit 415 can observe the variation in the weight measurements provided by the weight sensor 419.

The purchase assistance device 41 advantageously includes one or more image sensors 420 (or visual sensors).

Each of the image sensors 420 is designed to capture static images or videos including at least part of the opening of the portable container 4. When the portable container 4 is being carried using the purchase assistance device 41, the image sensors are used to capture an image of an item 1 in the opening and/or inside the portable container 4.

To do so, the central portion 411 of the purchase assistance device 41 advantageously includes a central image sensor 420, as shown in FIGS. 2 to 5. This central image sensor 420 is arranged at the center on the inner face of the central portion 411 such that the field of vision of the central image sensor 420 includes the inside of the portable container 4. The central image sensor 420 thus enables an image of the inside of the portable container 4 to be taken.

The purchase assistance device 41 advantageously also includes lateral image sensors 420 installed on either side of the central image sensor 420. Each of the lateral image sensors 420 enables an image of at least the corresponding half of the space of the opening of the portable container 4 to be taken.

In certain embodiments, when the portable container 4 is being carried by the purchase assistance device 41, the central imagesensor 420 is oriented (or directed) towards the inside of the portable container 4 and the lateral image sensors are oriented towards at least a portion of the contour of the opening of the portable container 4.

In certain embodiments, the purchase assistance device 41 includes a plurality of lateral image sensors 420, preferably uniformly distributed over the inner face of the central portion 411 and/or arranged on the face opposite the inside of the portable container 4 of the suspension arms 412.

In certain embodiments, the contour of the opening of the portable container 4 is covered by the combination of the fields of vision of the image sensors 420.

The acquisition of images by the image sensor 420 enables the visual recognition of the item or items 1 that may appear in the images taken. The acquisition of images from several image sensors 420 provides images of more than one side or view of the item 1 (images taken from several viewing angles), thereby facilitating recognition of the item 1.

More generally, the image sensor 420 is advantageously any sensor able to capture image data usable by the processing unit 415, such as a camera or digital camera, a 2D/3D camera, a 3D depth-sensing camera, or a stereoscopic image sensor. The image sensor 420 can include an omnidirectional lens, a wide-angle lens, a fish-eye lens or the like. Moreover, the lens can have reflective surfaces, such as flat, parabolic or conical mirrors, that can be used to provide a relatively large field of vision or multiple points of view, such as to optimize coverage of the inside of the portable container 4 and the space providing access to the inside thereof.

In certain embodiments, the image sensors 420 are arranged to provide volumetric data, notably a depth metric, enabling one or more dimensions of an item 1 appearing in the captured images to be evaluated.

In certain embodiments, the image sensor 420 is coupled to a lighting device to illuminate the scene (notably the inside of the portable container 4), if necessary, towards which the image sensor 420 is oriented.

Image capture can be ordered selectively by the processing unit 415, i.e. only of specific image sensors 420 and not of all of the image sensors 420. For example, only those image sensors 420 with fields of vision that overlap the field of vision of a movement sensor 418 detecting a movement capture one or more images, at the request of the processing unit 415 or as a result of coupling with said movement sensor 418.

In certain embodiments, the movement sensor 418 is coupled to one or more image sensors 420, so that detection of a movement through a portion of the opening of the portable container 4 automatically triggers capture of one or more images by the image sensor or sensors covering said portion of the opening.

For example, two infrared movement sensors 418 oriented towards the inside and/or the edges of the opening of the portable container 4 trigger the lateral image sensors adjacent thereto when a movement is detected. If additional images are required, the central image sensor 420 can be triggered a predetermined time later (for example one or two seconds, the moment when the item is placed and/or when a positive variation in the weight of the portable container 4 is detected).

The purchase assistance device 41 advantageously also includes a position sensor 421. This position sensor 421 is any means able to capture data used to determine the position of the purchase assistance device 41 in the point of sale 10. By way of example, the position sensor 421 is an RFID tag, a sound sensor (i.e. a microphone), a Bluetooth® chip, an antenna network, or a GPS receiver (if the GPS signal enables sufficiently precise locating of the device 41 within the point of sale 10).

The position of the purchase assistance device 41 inside the point of sale 10 can be expressed in:
- a two-dimensional XY coordinate system (or XYZ if the point of sale 10 is arranged over several floors) associated with the point of sale 10,
- a curved coordinate system, where the customer 3 is required to follow a customer route,
- a system partitioning the space of the point of sale 10 into several portions, such as sections 2 formed by store gondolas ("confectionery section", "culture section" for example), zones (store entrance, central aisle, discount area, promotion area, organic products area, a certain category or brand of products, cash register zone, for example), or levels (ground floor, level 1 or level 2 for example), or
- a combination of these systems.

In certain embodiments, the position sensor 421 is configured to receive signals emitted by:

beacons (for example Bluetooth® Low energy, RFID beacons, Bluetooth beacons, Wi-Fi beacons, sound beacons) or antennas deployed according to a mesh covering the point of sale 10. In certain embodiments, these beacons broadcast signals/frequencies attributed to zones or sections 2 and enable the precise locating of the purchase assistance device 41 in the point of sale 10, electronic price tags fastened to the shelves of the store gondolas. Indeed, like price information or promotional operations, location data (such as the identifier of the section 2, coordinates in the point of sale 10, or an identifier associated with a location of the point of sale 10) can be saved in this type of electronic tag, to determine the absolute or relative position of the purchase assistance device 41 in the point of sale 10.

In certain embodiments, the position of the purchase assistance device 41 is determined by listening, continuously, periodically or when requested by the processing unit 415, for the radio signal broadcast inside the point of sale 10.

In certain embodiments, the position of the purchase assistance device 41 is dated (timestamped) and saved in a buffer memory of predetermined size. The previous positions of the purchase assistance device 41 in the point of sale 10 are then available to the processing unit 415.

The purchase assistance device 41 also includes a distance sensor 424. This distance sensor 424 is configured to contactlessly measure a distance between said distance sensor 424 and an item 1, or more generally an object, at least partially within the measurement field of said distance sensor 424.

The distance sensor 424 can be an ultrasound distance measurement sensor or an optical distance measurement sensor such as a laser distance measurement sensor or an infrared distance measurement sensor.

Contactless distance measurement can be based on the principle of triangulation, on the transit time of light or sound (in the case of an ultrasound sensor), for example.

A distance sensor 424 arranged in the purchase assistance device 41 to face the opening of the portable basket 4 when said portable basket 4 is being carried using the purchase assistance device 41 enables the height of the content of the portable container 4 to be monitored. A variation in the height of the content of the portable container 4 caused by the addition or removal of an item 1 to/from the portable container 4 can then be detected by this distance sensor 424. In one embodiment, the processing unit 415 orders the capture of one or more images using predetermined image sensors 420 after such a variation is detected. These images can indicate a new background to be taken into consideration subsequently when processing the captured images. In another embodiment, if the height of the content of the portable container 4 changes, the processing unit 415 checks whether the weight of the portable container 4 has also changed.

In one embodiment, a first distance sensor 424 and a second distance sensor 424 are respectively arranged on two opposing faces of the purchase assistance device 41 to enable the distance measurements taken by these two distance sensors 424 to be used to determine a dimension in a given direction (longitudinal, transverse, vertical or any other) of an item 1 passing through the opening of the portable container 4 or located at least partially in the respective measurement fields thereof.

In one embodiment, a plurality of sensors arranged in pairs on opposing faces of the purchase assistance device 41 provides a valuation of the dimensions of an item 1 in more than one direction.

The measurements taken by the distance sensors 424 can be used in combination with or in addition to the dimensions determined using the images captured by the image sensors 424 to determine one or more dimensions (width, length, height) of an item 1.

In one embodiment, the detection by the movement sensor 418 of a movement through the opening of the portable container 4 triggers the contactless distance measurement by the distance sensor or sensors 424.

In another embodiment, the processing unit 415 controls an image sensor 420 as a function of one or more distance measurements taken by a distance sensor 424. By way of example, the processing unit 415 commands an image sensor 420 to zoom out, to zoom in or to point in a given direction as a function of a distance measured by a distance sensor 424.

In certain embodiments, the one or more retaining means 414 advantageously include a contact sensor 422. This contact sensor 422 is used to detect whether or not the purchase assistance device 41 is mounted on a portable container 4, whether the portable container 4 being carried using the purchase assistance device 41 is being carried or has been set down, and to notify the processing unit 415.

In certain embodiments, the contact sensor 422 is arranged on the inner face of the retaining means 414. In other embodiments, a first contact sensor 422 and a second contact sensor 422 are respectively arranged on the lower inner face and the upper inner face of the retaining means 414 in a ring shape. In this case, the first sensor is used to detect suspension of the portable container 4 using the purchase assistance device 41 (the portable container 4 being in contact with the lower inner face of the retaining means 414) while the second sensor 422 is used to detect the placement of this portable container 4 on a support or on the ground (where the portable container 4 comes into contact with the upper inner face of the retaining means 414).

In certain embodiments, the processing unit 415 is advantageously provided with a storage memory 423. This storage memory 423 includes a database, set up in advance, containing information on the list of items 1 offered for sale at the point of sale 10.

The information relating to the items 1 includes one or more visual models (visual signatures) for each item 1. Visual model of an item 1 means any description, based on descriptors and/or visual properties, distinguishing this item 1 in a list of items offered for sale at the point of sale 10.

More generally, a visual model includes any image data (such as color, texture, contrast, region, contour, geometric shape, dimensions, 3D model, pixels and structure) that can be used to establish a correlation with a captured image and to recognize an item 1. By way of example, the visual model of an item 1 includes a plurality of different images of said item 1. In certain embodiments, these images are different views (sides) of the item 1.

In certain embodiments, the visual model advantageously includes a deep-learning model or any other model based on a machine-learning method enabling an item 1 appearing in one or more images to be recognized.

In certain embodiments, more than one visual model is associated with a given item 1, these models covering a change in the visual appearance of the item 1, for example in the event of a promotional operation.

The information relating to the items 1 stored in the storage memory 423 also include metadata relating to each item 1, such as weight, position in the point of sale 10, universal product code (UPC) (a barcode or a QR code), price, internal reference in the point of sale 10, brand name, name, text or any other description of an item 1 and/or an alphanumeric symbol.

This information is regularly updated to take account of new items 1 and/or changes to the visual signature (such as new packaging) of an item 1 already offered for sale. Furthermore, the saved location/position data for the items 1 in the point of sale 10 are automatically or manually updated after each restock of the sections 2 of the point of sale 10.

In certain embodiments, the processing unit 415 also has an image recognition application. Using the information saved in the database, the image recognition application makes it possible to recognize, with a related confidence level, the item 1 appearing in the images captured by the image sensor or sensors 420. In one embodiment, the dimensions of the item 1 determined using the distance measurements taken by the distance sensors 424 are used by the image recognition application as an additional datum used to recognize the item 1.

To do so, the image recognition application is configured to perform a digital analysis and to extract the pertinent parameters from the image or images captured by the image sensor or sensors 420 and to compare these parameters (using one of the known image recognition algorithms) to the previously saved information on a reduced list of items 1 from the list (or set) of items 1 offered for sale at the point of sale 10. Following this comparison, the image recognition application determines whether an item 1 in this reduced list of items 1 appears in the captured images, with a related confidence level.

Indeed, the image recognition application makes it possible to extract, in the form of attributes, the visual properties of the captured images (such as color, texture, contrast, contour, geometric shape, dimensions, pixels, regions and structure) that, by comparison with the information previously saved, enable the item 1 appearing in the captured images to be recognized (image recognition by content).

In one embodiment, the image recognition application uses one or more convolutional neural networks that are able to learn by themselves how to extract pertinent characteristics from the captured image data to recognize an item 1 appearing in the captured images, using deep learning. In one embodiment, a neural network is allocated to a section, a set of sections or a zone of the point of sale 10. This enables the position of the purchase assistance device 41 in the point of sale 10 to be used to recognize the item 1 appearing in the captured images. A neural network can used previously established image databases.

As a variant or in combination, the image recognition application searches the captured images for the visual properties of certain items 1 (forming a reduced list) selected from the list of items 1 offered for sale. One or more corrections and/or transformations can be applied in advance to the captured images, such as segmentation in order to distinguish the background, or rotation to reorient an image.

In certain embodiments, volumetric data (sizes and shape or three-dimensional structure) of an item are determined from images captured from one or more image sensors 420, such as a 3D camera or a plurality of 2D cameras.

In certain embodiments, image recognition involves comparing a datum taken from the captured image with saved metadata relating to a reduced list of items 1 from the items 1 offered for sale. The extracted data can include the universal product code, a text (usually obtained using an optical character recognition (OCR) method), alphanumeric content or a graphical symbol.

In certain embodiments, using the information (visual models and metadata) relating to a reduced list of items 1, the image recognition application returns a list of candidate items, respectively, with a confidence level. This list of candidate items can be limited to a predetermined number (for example the three items with the highest confidence levels) or all of the candidate items with a confidence level greater than a predetermined value (such as 90% or 95%). In a variant, the image recognition application only returns the most probable candidate item, i.e. the item with the highest confidence level. If the image recognition application determines that the captured image does not contain any item 1 from the reduced list of items 1 used for comparison with a confidence level greater than a predetermined value, an empty list is returned. In other words, none of the items searched was found by the image recognition application in the captured image or images.

If only part of an item 1 appears in a captured image as a result of occlusion by other objects (hand of the customer 3, another item 1) or because part of the item 1 is outside of the field of vision of an image sensor 420, the image recognition application uses the information taken from the visible portion and potentially the distance measurements taken by the distance sensors 424, and uses a deep-learning model to recognize this item 1.

The saved visual model of an item 1 can be improved by a machine learning method (supervised or otherwise), with or without operator validation. The images taken by the image sensors 420 under different conditions (lighting, viewing angle, deformation, presence of dust, occlusion, for example) can be used to improve performance of the image recognition application. In this case, the visual model can be updated automatically and in real time, or later once validated by an operator. This helps to improve the capacity to recognize and identify items 1 in different lighting conditions and with partial or full images of items 1 taken from different viewing angles.

An item 1 can be identified using image recognition, preferably with verification of correspondence between its measured weight and the corresponding weight saved in the metadata, without having to search for the related UPC. However, recognition of the UPC of an item 1 in one or more captured images advantageously increases the confidence level when recognizing said item 1.

In certain embodiments, the confidence level with which an item is identified is a combination of a first confidence level linked to recognition of the item using the image and a second confidence level linked to recognition of the item using the weight thereof. The minimum acceptable confidence level can differ between items 1 or categories of items 1, or as a function of the price of the recognized item 1. In other words, if the price of the recognized item 1 is:

less than a predetermined amount (for example €10), then this recognition is admitted if obtained with a confidence level greater than 90%, between a first amount and a second amount (for example, between €10 and €50), then this recognition is admitted if obtained with a confidence level greater than 95%, greater than a predetermined amount (for example €50), then this recognition is admitted if obtained with a confidence level greater than 99%, In certain embodiments, the processing unit 415 is configured to measure the variation in the weight of the portable container 4 following detection of any movement by the movement sensor 418. To do so, in certain embodiments, the processing unit 415 calculates a difference between the weight values taken by the weight sensor 419 just before and just after capture of a movement notified by the movement sensor 418. The processing unit 415 compares this weight difference between candidate items identified by the image recognition application in order to recognize the item 1 that has just been placed in or removed from the portable container 4.

If the weight variation detected by the weight sensor 419 is positive, an item 1 is assumed to have just been placed in the portable container 4. In the opposite case, an item 1 is assumed to have just been removed from the portable container 4. An updated list of items 1 in the portable container 4 is thus kept up to date as the customer 3 shops in the point of sale 10.

In certain embodiments, if the weight variation detected by the weight sensor 419 is negative (i.e. in the event of removal of an item 1 from the portable container 4), the reduced list of items 1 used by the image recognition application to recognize an item 1 appearing in the captured images includes the list of recognized items 1 in the portable container 4 before said item was removed.

In certain embodiments, the reduced list of items 1 used to recognize an item 1 appearing in the captured images includes the items whose location in the point of sale 10 is close to the position of the purchase assistance device 41.

In certain embodiments, an item 1 is deemed to be close to the position of the purchase assistance device 41 if the distance between the location of the item 1 and the position of the purchase assistance device 41 is less than a predetermined value.

In another embodiment, an item 1 is deemed to be close to the position of the purchase assistance device 41 if the location of said item 1 and the position of the purchase assistance device 41 are within the same predefined zone (a section 2 or any other zone of the point of sale 10). This zone can be of any shape, such as circular, square, rectangular, L-shaped or any other geometric shape. The processing unit 415 is designed to use a geofencing method to detect the zone containing the purchase assistance device 41.

In another embodiment, an item 1 is deemed to be close to the position of the purchase assistance device 41 if the distance between the location of said item 1 and a previous position of the purchase assistance device 41 is less than a predetermined value, or if the location of said item 1 and a previous position of the purchase assistance device 41 are in the same predefined zone of the point of sale 10 (notably if the customer picks up an item, but places said item in the portable container 4 a few meters further on). In this case, recognition of the item 1 concerns items arranged in the sections/zones of the point of sale 10 already passed/visited by the customer 3, gradually going back through the movement log of the customer 3.

In certain embodiments, a previous position of the purchase assistance device 41 is a position in which said device remained for at least a predetermined duration (i.e. the time that the customer 3 paused and picked up an item 1). This helps to reduce the list of previous positions of the purchase assistance device 41 to be taken into consideration.

In certain embodiments, the reduced list of items 1 comprising items 1 offered for sale includes the items 1 associated with a store gondola deemed to be close to the position of the purchase assistance device 41. A store gondola is deemed to be close to the purchase assistance device 41 if the distance separating same is less than a predetermined distance, or if the store gondola and the position of the purchase assistance device 41 are within the same predefined zone of the point of sale 10.

In other embodiments, a store gondola is deemed to be close to the purchase assistance device 41 if the distance separating same from a previous position of the purchase assistance device 41 is less than a predetermined distance, or if the store gondola and a previous position of the purchase assistance device 41 are within the same predefined zone of the point of sale 10.

Advantageously, using a reduced list of items 1 to search for an item 1 appearing at least partially in the captured images (instead of searching through the full list of items 1 offered for sale) helps to speed up and facilitate recognition of said item 1.

The location of the purchase assistance device 41 in the point of sale 10 is in this case used to reduce the search field, in order to streamline and speed up recognition of the item 1 appearing in the captured images.

In other embodiments, the reduced list of items 1 used to recognize the item 1 appearing in the captured images includes the list of items purchased by the customer 3 in previous purchases (purchase history of the customer 3 in the point of sale 10).

In other embodiments, the reduced list of items 1 used to recognize the item 1 appearing in the captured images includes the items 1 offered for sale whose weight is substantially equal to the weight variation measured by the weight sensor 419.

In other embodiments, when a variation in the weights detected by the weight sensor 419 or in the height of the content of the portable container 4 measured by the distance sensor 424 is detected, the processing unit 415 triggers the capture of one or more images inside the portable container using at least one image sensor 420, notably the central image sensor 420. In certain embodiments, these images are used as additional verification means to identify an item 1 placed in/removed from the portable container 4, or as a datum (notably representing the background) enabling identification of an item 1 during a subsequent image recognition step.

The identification of items placed in/removed from the portable container 4 is used to keep the list of items 1 deemed to be contained therein up to date. This updated list of items 1 includes an identity of each item (UPC, internal reference in the point of sale 10, brand name, weight, illustrative photo, for example), the corresponding price, the updated total of the (recognized) items 1 in the portable container 4.

This updated list of items 1 in the portable container 4 is updated as the customer 3 fills the basket in the point of sale 10. In other words, as each new item 1 is placed in the portable container 4 or removed therefrom, said item is identified and the list is updated accordingly.

In certain embodiments, on account of the processing load or battery time, the item is identified by a remote processing server (not shown) connected to the processing unit 415 over the wireless communication interface 417 (a Wi-Fi link, for example). This processing server includes the image recognition application and the database (which is identical to or larger than the aforementioned database) of information on the items 1 offered for sale. For each item 1, this information includes a visual model and metadata (weight, price, location in the point of sale 10, a description, the UPC, an internal reference, for example).

The processing server makes it possible to use the data collected by the processing unit 415 from the sensors to identify, with a confidence level greater than a predetermined confidence level, an item that has just been placed in or removed from the portable container 4, thereby providing, via the processing unit 415 and/or via the processing server, an updated list of the items 1 in (or more precisely deemed to be in) the portable container 4 of the customer 3.

In this case, the processing unit 415 transfers the data compiled from the sensors to the processing server. In certain embodiments, these data are sent to the processing server following detection of a movement by the movement sensor 418. Based on the data supplied by the processing unit 415 and the database, the processing server identifies, with a confidence level greater than a predetermined value, the item 1 appearing in one or more of the captured images which it sends, potentially with other information on the item 1, to the processing unit 415.

In certain embodiments, the processing is shared between the processing unit 415 and the processing server. For example, the processing server handles image recognition of the item in question, this task requiring relatively more resources than other tasks involved in identifying an item 1. In a variant, the processing server is only used if the reduced list of items 1 includes more than a predetermined number of items 1, or only if the processing unit 415 fails to identify an item 1 using a reduced database (in which case the server is provided with a larger database).

In certain embodiments, one or more processing servers are shared between several wireless access points distributed throughout the points of sale 10 belonging to a single brand or otherwise. By way of example, a processing server shared between several points of sale 10 located in a shopping center or in a duty-free zone.

In other embodiments, the processing server is used when the battery level of the purchase assistance device 41 is below a given threshold.

The processing server can in turn delegate some or all of the requests from the processing unit 415 to one or more other servers, with a view to providing a quicker response.

More generally, the item 1 just placed in or removed from the portable container can be recognized locally using the processing unit 415 and/or remotely using the processing server.

In certain embodiments, the processing means (i.e. the processing unit 415 or the processing server) is in wireless communication (or cabled communication, for the processing server) with other servers (not shown) of the IT infrastructure of the point of sale 10 such as cash registers, the payment system, the customer account server, a push notification server and/or a messaging server.

In other embodiments, the processing unit 415 includes an identifier used to uniquely identify the purchase assistance device 41.

In other embodiments, the purchase assistance device 41 has one or more card readers (contactless or otherwise) (not shown) connected to the processing unit 415. A card reader enables the purchase assistance device 41 to be associated with a customer identifier read from a card (physical or virtual in the form of a mobile application installed on a user terminal) such as a loyalty card, a subscription card, a payment card or a membership card. A customer identifier can be a card number, a telephone number, a membership number, an email address, full name, date of birth.

The processing unit 415 is configured to associate the updated list of recognized items 1 in the portable container 4 with the customer identifier, with the identifier of the processing unit or with a combination of these two identifiers.

In certain embodiments, the processing unit 415 has a payment and/or loyalty point management function. Indeed, the updated list of items 1 in the portable container 4 enables the customer to pay for these items 1 using a dedicated mobile application that communicates with this functionality. Following payment, the loyalty points management functionality automatically updates the customer account held by a customer account server.

To operate the electronic components in the purchase assistance device 41, this latter has a rechargeable electricity source (notably a rechargeable battery) and a connection to enable recharging (not shown).

The purchase assistance device 41 advantageously includes indicator lights (multicolor LEDs) to inform the customer 3 of the operating state of the purchase assistance device 41 (in operation, customer identifier read successfully, low battery, failed item identification, successful identification of item just placed in/removed from the portable container 4, payment validation). As a variation or in combination, the purchase assistance device 41 includes a display screen that is connected to the processing unit 415 and configured to provide the customer 3, automatically or when requested by the customer using physical or virtual buttons (touchscreen) with information on the purchase assistance session. This information includes, for example, the customer identifier and/or the identifier of the purchase assistance device 41, an updated list of the items 1 in the portable container 4, preferably with the detailed total of these items 1, the log of items 1 placed in/removed from the portable container 4, full information on the operating state of the purchase assistance device 41 (photo and/or name of the last item 1 identified, error message, information on the payment process). In one embodiment, the processing unit 415 is designed to display, on the display screen, the current position and/or the previous positions of the purchase assistance device 41 in the point of sale 10. In one embodiment, the processing unit 415 is designed to display, on said display screen, promotional or advertising content retrieved from a remote server. Preferably, this promotional or advertising content is selected as a function of the position of the purchase assistance device 41, and/or of the updated list of items 1 in the portable container 4, and/or the information obtained using an identifier of the customer 3 (purchase history of said customer 3 in this point of sale 10, age or sex of the customer 3).

In a variant or in combination, the purchase assistance device 41 uses the wireless communication interface 417 to provide information/notifications to a mobile application installed on the mobile terminal of the customer 3 (updated list of items, electronic till receipt, additional information on a given item, unidentified item warning, request for the customer 3 to reinsert the last unidentified item, request for the customer to confirm a given item having a confidence level below a predetermined value, for example)

In one use of the purchase assistance device 41 described above, said device is provided to customers 3 by the point of sale 10 on a handle holder 6 arranged at the entrance to the point of sale 10. Preferably, the handle holder 6 recharges the rechargeable electric power source of the purchase assistance device 41 held thereby. This handle holder 6 is therefore also an electrical recharging station.

An example implementation of the purchase assistance method for a customer 3 is shown by the diagram in FIG. 7.

The customer 3 picks up the purchase assistance device 41 and mounts same on a portable container 4 that belongs to said customer or that is provided by the point of sale 10.

In certain embodiments, the detection by the contact sensor 422 that a portable container 4 is being carried by the purchase assistance device 41 (for example in the form of a handle) triggers the opening 30 of a purchase assistance session. Alternatively, the opening 30 of a purchase assistance session is triggered by identification of the customer 3 by the card reader of the purchase assistance device 41. The customer card can be a physical card (a loyalty card, a subscription card, a bank card, contactless or otherwise, for example) or a virtual card in the form of a mobile application installed on a mobile terminal that is able to communicate with the card reader and that enables the customer 3 to be uniquely identified. The customer identifier can comprise one or more data, such as a card number, a membership number, a telephone number, an email address, a date of birth, the issue date of a card, the surname or given name of the customer. In certain embodiments, identification of the customer 3 enables access to other information, such as the purchase history of said customer 3 in said point of sale 10, and the age and sex of the customer 3.

In certain embodiments, a purchase assistance session is opened by the processing unit 415 if a change above a predetermined value is detected in any of the data previously captured by the sensors and saved by the processing unit 415 in a buffer memory.

For example, a session is opened upon detection of a change in the location of the purchase assistance device 41 and/or in the weight of the portable container 4, and/or upon detection of a movement by the movement sensor 418.

In other embodiments, the purchase assistance session is opened manually by pressing a button provided for this purpose on the purchase assistance device 41.

A purchase assistance session identifier is attributed to the session opened. In certain embodiments, this session identifier is obtained by combining the customer identifier with other data, such as a randomly generated code, the date or time of identification, or a code identifying the purchase assistance device 41 saved permanently by the processing unit 415.

Where the purchase assistance device is connected to a processing server, the purchase assistance session is opened with said server. Otherwise, the session is opened locally and handled by the processing unit 415.

If the customer 3 is not identified, the session identifier includes the code identifying the purchase assistance device 41 alone or combined with any other code.

The purchase assistance session at the point of sale 10 has a predetermined lifetime. This lifetime can depend on the size of the point of sale 10 or the number of items offered for sale by the point of sale 10. The purchase assistance session is closed once this lifetime has elapsed or if no activity is detected by the sensors arranged in the purchase assistance device 41 for a predetermined time.

In other embodiments, the purchase assistance session is kept open as along as one or more data are captured by the sensors of the purchase assistance device 41 (the position sensor 421 and/or the movement sensor 418, for example) and saved by the processing unit 415 in a buffer memory are changed before expiry of a predetermined idle time. In other words, a purchase assistance session can be closed if the data available to the processing unit 415 have not changed for a predetermined period of time. In this case, the lifetime of the purchase assistance session is determined dynamically.

The purchase assistance session can also be instructed to close by a remote server (for example the processing server or the payment system following validation of a payment).

In certain embodiments, if the customer has opened the purchase assistance session using a mobile application communicating with the purchase assistance device 41, once the purchase assistance session has been opened, the processing unit 415 exchanges data with this mobile application installed on the mobile terminal of the customer (for example a smart phone, tablet or phablet), automatically or when requested by the customer, such as to (temporarily) link or associate this mobile terminal to the purchase assistance device 41, or similarly to associate the customer 3 with the portable container 4 (as opposed to all of the other portable containers 4 in the point of sale 10). The customer 3 can consult the updated list of items in the portable container 4, the item prices and the total price of the items at any time on their mobile terminal.

When a purchase assistance session is opened, it is assumed that no items 1 have yet been placed in the portable container 4 by the customer 3. The measurements taken by the weight sensor 419 and the distance sensor 424 are therefore assumed to be the empty weight and the empty height respectively of the content of the portable container 4. These measurements are saved in a buffer memory.

In certain embodiments, one or more images of the inside (including the bottom) of the portable container 4 are captured by the image sensors 420 at the opening 30 of the purchase assistance session. These initial image data can subsequently facilitate recognition of the items 1 placed in/removed from the portable container 4. The information included in these initial image data makes it possible to identify the background of the captured images subsequently during the purchase assistance session.

Following opening 30 of a purchase assistance session and during the purchase assistance step 31, the purchase assistance device identifies the items 1 placed in or removed from the portable container 4 as the customer 3 adds items to their basket, in order to provide an updated list of the items in the portable container 4.

During the purchase assistance step 31, the processing unit 415 has the following information:
- the current position (and potentially the previous positions) of the purchase assistance device 41 in the point of sale 10 provided by the position sensor 421,
- the weight of the items 1 in the portable container 4 measured by the weight sensor 419,
- one or more images once a movement has been detected by the movement sensor 418.

As explained above, this information can be used locally by the processing unit 415 or remotely by the processing server in order to identify, with a given confidence level, an item 1 that has just been placed in the portable container 4 or removed therefrom.

Indeed, once a movement is detected by one of the movement sensors 418, images are captured by the image sensor or sensors 420 and the distance measurements are taken by the distance sensors 424 and together provided to the processing unit 415.

An estimate is made of the variation in the weight of the portable container 4 using the measurements taken by the weight sensor 419. If this variation is substantially zero, it is then assumed that no items have just been placed in/removed from the portable container 4. In this case, no action is taken.

If a positive variation (i.e. addition of an item 1) in the weight of the portable container 4 is greater than a predetermined value, the position of the purchase assistance device 41 (and possibly also the previous positions thereof) is used to determine a reduced list of items 1 from the list of items 1 offered for sale by the point of sale 10. The weight of this item (deemed to be equal to the weight variation) and the captured images are then used by the processing unit 415 or by the processing server to identify the item in question, with a confidence level.

In the event of a negative variation in the weight of the portable container 4, the reduced list of items is the updated list of items in the portable container 4 kept by the processing unit 415 (or by the processing server) just before this weight change.

In other embodiments, the reduced list of items 1 used by the processing means (i.e. unit and/or processing server) to recognize an item 1 appearing in the captured images is determined as a function of the current position and/or the previous positions (for example, from the time of opening 30 of the purchase assistance session) of the purchase assistance device 41.

In certain embodiments, the reduced list of items 1 includes the history of purchases made by the customer 3 in the point of sale 10 or the items 1 common to the purchase history and the items 1 determined as a function of the position (or previous positions) of the purchase assistance device 41.

In certain embodiments, if the portable container 4 is placed on a support or on the ground (this information being obtainable using the data returned by the contact sensor 422), the processing unit 415 maintains, for a predetermined time, the updated list of items recognized in the portable container 4 and identifies all items placed in/removed from this portable container 4, temporarily disregarding the measurements taken by the weight sensor 419.

In certain embodiments, if the processing means (i.e. the processing unit 415 or the processing server) does not recognize any item 1 with a confidence level above a predetermined threshold, said processing means invite the customer 3, by means of a notification displayed on the customer's mobile terminal, to show the last item 1 inserted or removed more clearly, for example, to the central image sensor 420 to facilitate identification thereof.

If the item 1 still cannot be identified with the additional images with a predetermined confidence level, the captured images are saved by the processing server to be processed subsequently by an operator.

During the payment step 32, the customer 3 provides a cash register with a code identifying the purchase assistance device 41 (by entering said code or showing a barcode or a QR code of the device to a reader of the cash register) and/or a customer identifier (email address, surname, given name, telephone number, for example) that the processing unit 415 uses to link the purchase assistance device 41 to this customer 3. Using this information, the cash register communicates directly with the processing unit 415 or with the processing server to retrieve the updated list of items 1 in the portable container 4 and to handle the payment process.

In certain embodiments, the purchase assistance device 41 incorporates a mobile payment function enabling the customer 3 to pay using their mobile terminal. Proof of purchase is sent to the customer electronically.

Once the purchase transaction has been completed, the purchase assistance session is closed and the purchase assistance device 41 can be returned to the handle holder 6.

In the different embodiments described above, reference is made to a customer. It should however be noted that this purchase assistance device 41 can also be used by any other person, such as an employee of the point of sale 10 entrusted with filling a shopping basket on behalf of a customer.

Advantageously, the methods and systems for assisting a purchase described above enable:
- identification and counting in real time of the items 1 selected by the customer 3 for purchase, such as to facilitate the payment process,
- continuous scanning of the content of the portable container 4 as the customer 3 shops,
- reduced inconvenience to the customer 3 during the shopping process, the customer's involvement not being overt,
- reliable scanning of the content of the portable container 4, saving time and increasing efficiency for the customer, and
- an enhanced shopping experience for the customer, reducing the time spent in the point of sale to time that seems useful to the customer, thereby ensuring customer satisfaction, notably in terms of perceived elapsed time.

Although the purchase assistance system is described above with reference to embodiments and variants, the person skilled in the art will understand that these embodiments and variants are not limiting and can be combined with each other and/or with any other equivalent embodiment.

The invention claimed is:

1. A system comprising a device for assisting a purchase by a customer at a self-service retail point of sale, the device including:
   a central portion,
   suspension arms which are connected to the central portion and extend on either side of the central portion, the suspension arms being intended to be connected to a portable container provided with an opening enabling an item offered for sale at the point of sale to be placed in this portable container so as to allow the portable container to be carried by the device, the central portion facing the opening when the device is being used to carry the portable container,
   at least one movement sensor which is configured to detect a movement through the opening of the portable container, when the device is being used to carry the portable container,
   at least one image sensor which is configured to detect at least one image of a scene at least partially covering the opening, when the device is being used to carry the portable container and the movement sensor has detected a movement through the opening,
   a position sensor which is configured to determine the current position of the device in the point of sale,
   the system also including:
   a processor provided with information on a list of items offered for sale at the point of sale and that are configured to recognize, with a predetermined confidence level, an item appearing in the at least one image, this item being recognized from a reduced list of items included in the list of items, this reduced list of items being determined as a function of a position of the device determined by the position sensor,
   the purchase assistance device also including a handle that is linked to the central portion.

2. The system as claimed in claim 1, wherein the reduced list of items is determined as a function of the current position and/or a previous position of the purchase assistance device.

3. The system as claimed in claim 1, wherein the central portion of the purchase assistance device includes an image sensor.

4. The system as claimed in claim 1, wherein the purchase assistance device also includes a weight sensor that is configured to measure a variation in the weight of the portable container when the device is being used to carry the portable container, the processor also using this variation to recognize the item appearing in the at least one image.

5. The system as claimed in claim 1, wherein the purchase assistance device also includes at least one distance sensor that is configured to measure a distance between the distance sensor and an item at least partially within the measurement field of the distance sensor, contactlessly and when the device is being used to carry the portable container.

6. The system as claimed in claim 1, wherein the suspension arms include a retainer that are designed to hold this portable container open when the device is being used to carry the portable container.

7. The system as claimed in claim 6, wherein the retainer includes a contact sensor that is configured to detect the use of the device to carry a portable container.

8. The system as claimed in claim 1, wherein the device also includes a card reader that is configured to read a customer identifier from a physical or virtual card, the processor being configured to associate the device with the customer identifier.

9. The system of claim 1, wherein the portable container is made of deformable material.

10. A system comprising a device for assisting a purchase by a customer at a self-service retail point of sale, the device including:
    a central portion,
    suspension arms which are connected to the central portion and extend on either side of the central portion, the suspension arms being intended to be connected to a portable container provided with an opening enabling an item offered for sale at the point of sale to be placed in this portable container so as to allow the portable container to be carried by the device, the central portion facing the opening when the device is being used to carry the portable container,
    at least one movement sensor which is configured to detect a movement through the opening of the portable container, when the device is being used to carry the portable container,
    at least one image sensor which is configured to detect at least one image of a scene at least partially covering the opening, when the device is being used to carry the portable container and the movement sensor has detected a movement through the opening,
    a position sensor which is configured to determine the current position of the device in the point of sale,
    the system also including:
    a processor provided with information on a list of items offered for sale at the point of sale and that are configured to recognize, with a predetermined confidence level, an item appearing in the at least one image, this item being recognized from a reduced list of items included in the list of items, this reduced list of items being determined as a function of a position of the device determined by the position sensor,
    the suspension arms including a retainer that are designed to hold this portable container open when the device is being used to carry the portable container,
    the retainer including a contact sensor that is configured to detect the use of the device to carry a portable container.

11. The system as claimed in claim 10, wherein the reduced list of items is determined as a function of the current position and/or a previous position of the purchase assistance device.

12. The system as claimed in claim 10, wherein the central portion of the purchase assistance device includes an image sensor.

13. The system as claimed in claim 10, wherein the purchase assistance device also includes a weight sensor that is configured to measure a variation in the weight of the portable container when the device is being used to carry the portable container, the processor also using this variation to recognize the item appearing in the at least one image.

14. The system as claimed in claim 10, wherein the purchase assistance device also includes at least one distance sensor that is configured to measure a distance between the distance sensor and an item at least partially within the measurement field of the distance sensor, contactlessly and when the device is being used to carry the portable container.

15. The system as claimed in claim 10, wherein the purchase assistance device also includes a handle that is linked to the central portion.

16. The system as claimed in claim 10, wherein the device also includes a card reader that is configured to read a customer identifier from a physical or virtual card, the processor being configured to associate the device with the customer identifier.

\* \* \* \* \*